(12) United States Patent
Slobodyanyuk et al.

(10) Patent No.: US 10,534,074 B2
(45) Date of Patent: Jan. 14, 2020

(54) HYBRID SCANNING LIDAR SYSTEMS

(71) Applicant: QUALCOMM Incorporated, San Diego, CA (US)

(72) Inventors: Volodimir Slobodyanyuk, San Diego, CA (US); Matthew Grob, La Jolla, CA (US); John Wyrwas, Mountain View, CA (US); Karim Arabi, San Diego, CA (US); Rajesh Pankaj, San Diego, CA (US); Evgeni Gousev, Saratoga, CA (US); Sajith Balraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 15/253,687

(22) Filed: Aug. 31, 2016

(65) Prior Publication Data

US 2018/0059221 A1 Mar. 1, 2018

(51) Int. Cl.
*G01S 7/48* (2006.01)
*G01S 7/481* (2006.01)
*G01S 17/06* (2006.01)

(52) U.S. Cl.
CPC .......... *G01S 7/4814* (2013.01); *G01S 7/4808* (2013.01); *G01S 17/06* (2013.01)

(58) Field of Classification Search
CPC ...... G01S 7/4817; G01S 7/4818; G01S 17/42; G02B 6/3588; G02B 6/4204; G02B 6/3512; G02B 6/3538; G02B 6/3556
See application file for complete search history.

(56) References Cited

U.S. PATENT DOCUMENTS

| | | | |
|---|---|---|---|
| 7,297,934 B2 | 11/2007 | Kane | |
| 7,532,311 B2 | 5/2009 | Henderson et al. | |
| 7,952,781 B2 | 5/2011 | Weiss et al. | |
| 8,736,818 B2 | 5/2014 | Weimer et al. | |
| 8,922,764 B2 | 12/2014 | Urano et al. | |
| 2003/0066954 A1 | 4/2003 | Hipp | |
| 2006/0132752 A1* | 6/2006 | Kane | G01S 7/4817 356/5.02 |
| 2010/0097678 A1 | 4/2010 | Hajjar et al. | |

(Continued)

FOREIGN PATENT DOCUMENTS

WO 2011144454 A1 11/2011

OTHER PUBLICATIONS

International Search Report and Written Opinion—PCT/US2017/041476—ISA/EPO—dated Oct. 16, 2017.

*Primary Examiner* — Luke D Ratcliffe
(74) *Attorney, Agent, or Firm* — Kilpatrick Townsend & Stockton, LLP

(57) ABSTRACT

Disclosed herein are techniques for light beam scanning in a light detection and ranging (LIDAR) system. The LIDAR system includes a beam shaping subsystem configured to generate an illumination pattern elongated in a first direction, and a scanning subsystem configured to direct the elongated illumination pattern towards a plurality of positions along a second direction different from the first direction. The LIDAR system further includes a sensor configured to generate a detection signal in response to detecting light reflected by a target object illuminated by the elongated illumination pattern, and a processor configured to determine a characteristic of the target object based on the detection signal.

17 Claims, 8 Drawing Sheets

(56) References Cited

U.S. PATENT DOCUMENTS

2011/0043806 A1* 2/2011 Guetta ................ G01S 17/026
356/432
2012/0212727 A1 8/2012 Hammes
2015/0301180 A1* 10/2015 Stettner ................ G01S 17/107
356/5.01

* cited by examiner

HYBRID SCANNING LIDAR SYSTEMS

BACKGROUND

Light beams may be used to measure distances between objects. For example, a light detection and ranging (LIDAR) system is an active remote sensing system that can use light beams to obtain the range, i.e., distance, from a source to one or more points on a target. A LIDAR system uses a light beam (typically a laser beam) to illuminate the target and measures the time it takes for the emitted light beam from the source to arrive at the target and then return to a detector near the source or at a known location. In other words, the range from the source to a point on the target can be determined based on the time-of-flight (ToF) of the light beam from the source to the detector. To measure ranges to multiple points on a target or in a field-of-view of the LIDAR system, the laser beam is usually scanned in one or more dimensions. In various LIDAR systems, the scanning mechanism may be complicated, thus rendering the system complicated; the scanning range may be limited due to power and safety considerations; and the resolution and accuracy of the systems may be limited.

BRIEF SUMMARY

Techniques disclosed herein relate to LIDAR beam scanning. In various embodiments, hybrid LIDAR systems that can overcome limitations of flash LIDAR systems and two-dimensional scanning LIDAR systems are described.

In accordance with an example implementation, a LIDAR system may include a first beam shaping subsystem configured to generate an illumination pattern that is elongated in a first direction, and a scanning subsystem configured to direct the elongated illumination pattern towards a plurality of positions along a second direction different from the first direction. The LIDAR system may further include a sensor configured to generate at least one detection signal in response to detecting light reflected by a target object illuminated at least partially by the elongated illumination pattern, and a processor configured to determine a characteristic of the target object based on the at least one detection signal.

In various implementations of the LIDAR system, an aspect ratio between a size in the first direction and a size in the second direction of the elongated illumination pattern may be greater than 10. In some implementations, the elongated illumination pattern may include a thin line, a quadrangle, or an ellipse. In some implementations, the second direction may be orthogonal to the first direction.

In some implementations of the LIDAR system, the first beam shaping subsystem may include at least one of a cylindrical lens, a micro-optical element, or a lens array. In some implementations, the scanning subsystem may include at least one of a rotation stage, an optical phased array, a vertical cavity surface-emitting laser (VCSEL) array, a microelectromechanical (MEMS) reflector, an optical fiber, or a piezoelectric element. In some implementations, the sensor may include a one-dimensional array of detectors arranged along the first direction. In some implementations, the sensor may include a two-dimensional detector array having an aspect ratio between a length and a width of the two-dimensional detector array greater than 10.

In some implementations, the LIDAR system may further include a second beam shaping subsystem configured to project the light reflected by the target object illuminated by the elongated illumination pattern onto the sensor. In some implementations, the second beam shaping subsystem may be configured to focus the light reflected by the target object at least in the second direction. In some implementations, the second beam shaping subsystem may include at least one of a cylindrical lens, a micro-optical element, or a lens array. In some implementations, the LIDAR system may also include a pulsed laser configured to emit a light beam, where the first beam shaping subsystem is configured to transform the light beam into at least a part of the elongated illumination pattern.

In accordance with an example implementation, a method for remote sensing may include generating an illumination pattern elongated in a first direction by a first beam shaping subsystem, and controlling a scanning subsystem by a controller to direct the elongated illumination pattern towards a plurality of positions along a second direction different from the first direction. The method may further include generating at least one detection signal by a sensor in response to detecting light reflected by a target object illuminated at least partially by the elongated illumination pattern, and determining a characteristic of the target object by a processor based on the at least one detection signal.

In some implementations of the method for remote sensing, an aspect ratio between a size in the first direction and a size in the second direction of the elongated illumination pattern may be greater than 10. In some implementations, the second direction may be orthogonal to the first direction. In some implementations, the elongated illumination pattern may include a thin line, a rectangle, or an ellipse.

In some implementations of the method for remote sensing, the first beam shaping subsystem may include at least one of a cylindrical lens, a micro-optical element, or a lens array. In some implementations, the sensor may include a one-dimensional array of detectors arranged along the first direction. In some implementations, the sensor may include a two-dimensional detector array having an aspect ratio between a length and a width of the two-dimensional detector array greater than 10.

In some implementations, the method for remote sensing may further include projecting the light reflected by the target object illuminated by the elongated illumination pattern onto the sensor by a second beam shaping subsystem. In some implementations, the second beam shaping subsystem may be configured to focus the light reflected by the target object at least in the second direction.

In accordance with another example implementation, an apparatus may be provided which may include means for generating an illumination pattern elongated in a first direction and means for directing the elongated illumination pattern towards a plurality of positions along a second direction different from the first direction. The apparatus may further include means for generating at least one detection signal in response to detecting light reflected by a target object illuminated at least partially by the elongated illumination pattern and means for determining a characteristic of the target object based on the at least one detection signal.

In some implementations of the apparatus, an aspect ratio between a size in the first direction and a size in the second direction of the elongated illumination pattern may be greater than 10. In some implementations, the means for generating the elongated illumination pattern may include at least one of a cylindrical lens, a micro-optical element, or a lens array. In some implementations, the means for generating the at least one detection signal may include a one-dimensional array of detectors arranged along the first direction. In some implementations, the apparatus may further include means for projecting the light reflected by the target object illuminated by the elongated illumination pattern onto the means for generating the at least one detection signal.

In accordance with yet another example implementation, a non-transitory computer-readable storage medium may include machine-readable instructions stored thereon. The instructions, when executed by one or more processors, may cause the one or more processors to control a scanning subsystem through a controller to direct an illumination pattern elongated in a first direction towards a plurality of positions along a second direction different from the first direction, where the elongated illumination pattern may be generated by a beam shaping subsystem. The instructions may further cause the one or more processors to receive at least one detection signal generated by a sensor in response to detecting light reflected by a target object illuminated at least partially by the elongated illumination pattern, and determine a characteristic of the target object based on the at least one detection signal.

In some implementations of the non-transitory computer-readable storage medium, an aspect ratio between a size in the first direction and a size in the second direction of the elongated illumination pattern may be greater than 10. In some implementations, the beam shaping subsystem may include at least one of a cylindrical lens, a micro-optical element, or a lens array. In some implementations, the sensor may include a one-dimensional array of detectors arranged along the first direction.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Techniques disclosed herein relate to a hybrid light detection and ranging (LIDAR) system that overcomes some limitations of flash LIDAR systems and two-dimensional scanning LIDAR systems. The hybrid LIDAR system may include a beam shaping subsystem configured to generate an illumination pattern elongated in a first direction, a scanning subsystem configured to scan the elongated illumination pattern in a second direction different from the first direction, and an elongated detector array for detecting light reflected by a target object that is illuminated by the elongated illumination pattern during the scanning.

A LIDAR system, also referred to as a laser detection and ranging (LADAR) system, is an active remote sensing system that can be used to obtain the range from a source to one or more points on a target. A LIDAR uses a light beam, typically a laser beam, to illuminate the one or more points on the target. Compared with other light sources, a laser beam may propagate over long distances without spreading significantly (highly collimated), and can be focused to small spots so as to deliver high optical power densities over long distance and provide fine resolution. The laser beam may be modulated such that the transmitted laser beam includes a series of pulses. The transmitted laser beam may be directed to a point on the target, which may reflect the transmitted laser beam. The laser beam reflected from the point on the target can be measured, and the time-of-flight (ToF) from the time a pulse of the transmitted light beam is transmitted from the source to the time the pulse arrives at a detector near the source or at a known location may be measured. The range from the source to the point on the target may then be determined by, for example, $r=c \times t/2$, where r is the range from the source to the point on the target, c is the speed of light in free space, and t is the ToF of the pulse of the light beam from the source to the detector.

Figure 1:
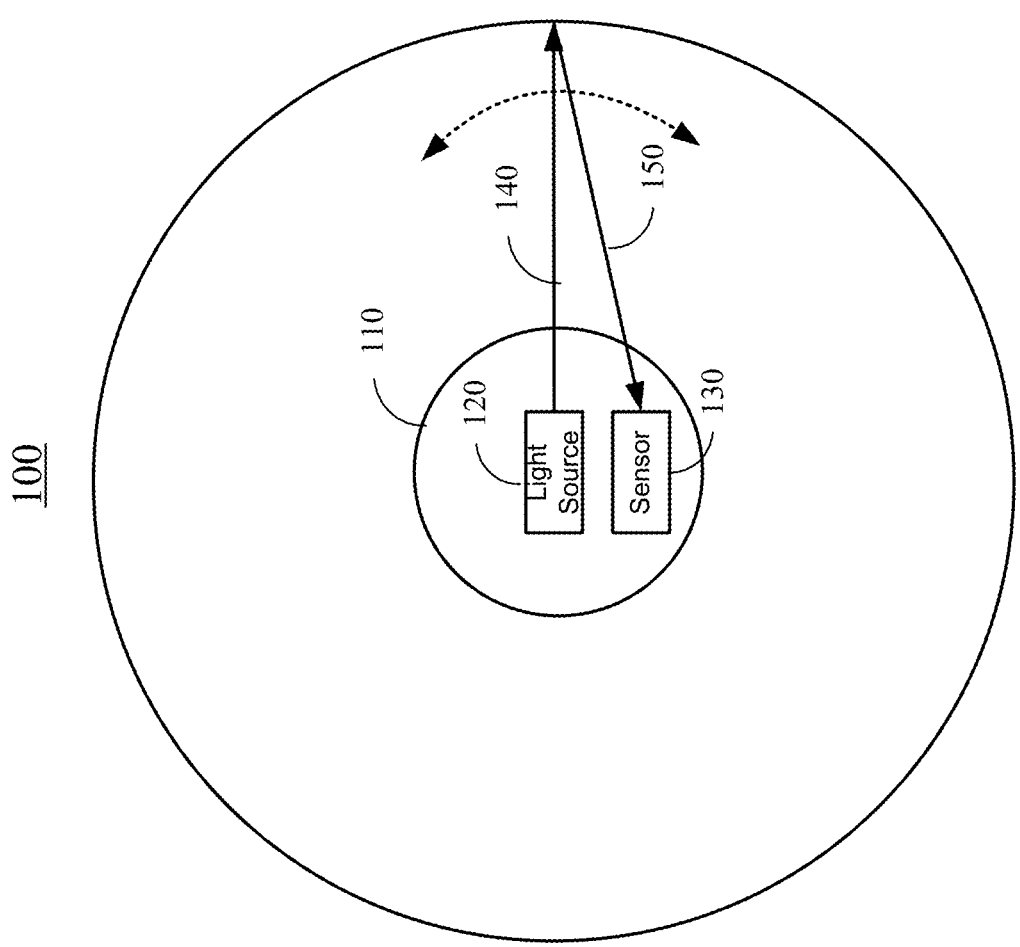
FIG. 1 is a simplified block diagram of an example light detection and ranging (LIDAR) system.

FIG. 1 is a simplified block diagram of an example LIDAR system 100. System 100 may include a scanning platform 110 that may be used to scan the laser beam in different directions. Scanning platform 110 may include a light source 120 and a sensor 130. Light source 120 may emit a light beam 140 towards a target object, which may reflect a portion of light beam 140 as a reflected beam 150. The reflected beam 150 may then be collected and detected by sensor 130.

Light source 120 may include an optical source, such as a laser, a laser diode, a vertical cavity surface-emitting laser (VCSEL), a light-emitting diode (LED), or other optical source. The laser may be, for example, an infrared pulsed fiber laser or other mode-locked laser with an output wavelength of, for example, 930-960 nm, 1030-1070 nm, around 1550 nm, or longer.

Sensor 130 may include a detector having a working (sensitive) wavelength comparable with the wavelength of the laser source. The detector may be a high speed photodetector, for example, a PIN photodiode with an intrinsic region between a p-type semiconductor region and an n-type semiconductor region, or an InGaAs avalanche photodetector (APD). In some systems, sensor 130 may include a silicon photomultiplier (SiPM) sensor.

Scanning platform 110 may use many different types of beam scanning mechanisms, for example, a rotating platform driven by a motor, a multi-dimensional mechanical stage, a Galvo-controlled mirror, a microelectromechanical (MEMS) mirror driven by micro-motors, a piezoelectric translator/transducer using piezoelectric material such as a quartz or lead zirconate titanate (PZT) ceramic, an electromagnetic actuator, or an acoustic actuator. Scanning platform 110 may be a platform without mechanical movement of any component, for example, using a phased array technique where phases of laser beams from lasers in a one-dimensional (1-D) or two-dimensional (2-D) laser array may be modulated to alter the wavefront of the superimposed laser beam.

As scanning platform 110 points light beam 140 at different directions using any beam scanning mechanism, such as the scanning mechanism described above, light beam 140 may illuminate different target objects or different locations of a target object during the scanning. During the scanning, reflected beam 150 from the different target objects or different locations of the target object may be collected and detected by sensor 130 to generate detection signals, which may then be used by an analyzer or a processor to determine the characteristics of the target objects, such as their distances from system 100 and their reflective properties, or generate an image of the scanned area. When scanning platform 110 revolves one round, LIDAR system 100 may perform measurements of a "slice" of the surrounding environment. Because the light spot of light beam 140 on the targets has a finite size (e.g., height and width), an image of a 2.5-dimensional (2.5-D) region of the environment may be generated.

To achieve a 3-dimensional (3-D) scanning of the environment, a LIDAR system may use either multiple sets of lasers/detectors or a 2-D scanning mechanism, such that the overall system can scan not only in one plane as shown in FIG. 1, but also in a plurality of different planes.

Figure 2:
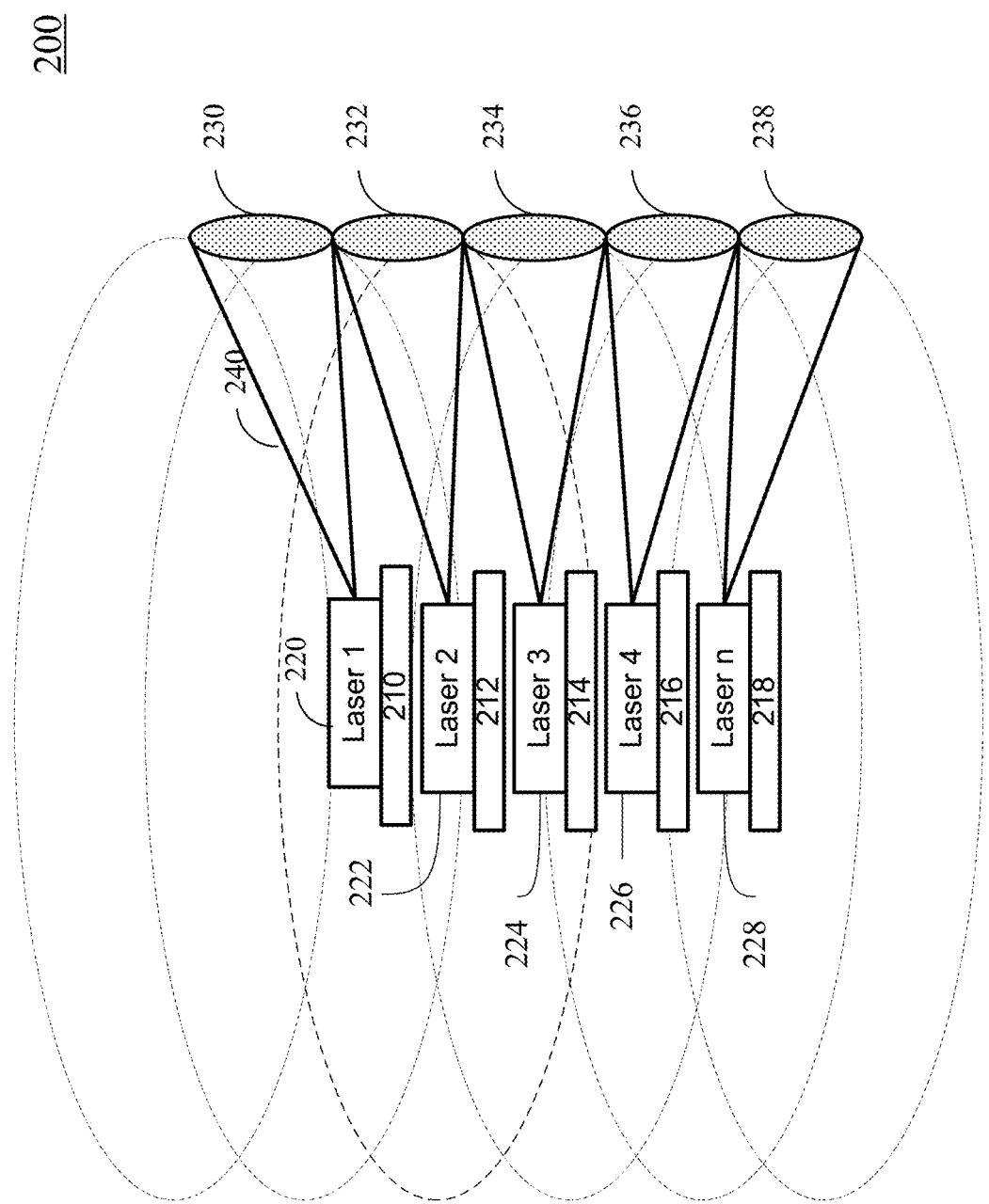
FIG. 2 illustrates an example LIDAR system using multiple sets of scanning platforms.

FIG. 2 illustrates an example LIDAR system 200 using multiple sets of scanning platform. Each set of scanning platform may include a light source (e.g., a laser) and a sensor on the scanning platform and is configured to perform a scanning in a plane as described above with respect to FIG. 1. Each set of scanning platform may be configured to cover a different 2.5-D region in the environment such that a 3-dimensional region of the environment including multiple 2.5-D regions may be measured.

As shown in FIG. 2, the 3-D scanning of the environment may be achieved by tilting the light beam from the light source in each scanning platform differently from light beams from other light sources, such that the scanning planes for different scanning platforms are not in parallel with each other, and choosing the beam width and the titling angle in a way so as to allow overlapping between adjacent beams such that there are no gaps in the vertical coverage. For example, as shown in FIG. 2, scanning platform 210 may include a laser 1 (220) and a sensor (not shown). Light beam 240 from laser 1 (220) may be tilted upwards to illuminate an area 230 in the environment. Similarly, scanning platform 212 may include a laser 2 (222) and a sensor (not shown), and a light beam from laser 2 (222) may be tilted upwards to illuminate an area 232 in the environment. Scanning platform 214 may include a laser 3 (224) and a sensor (not shown), and a light beam from laser 3 (224) may be tilted at zero degree to illuminate an area 234 in the environment. Scanning platform 216 may include a laser 4 (226) and a sensor (not shown), and a light beam from laser 4 (226) may be tilted downwards to illuminate an area 236 in the environment. Scanning platform 218 may include a laser n (228) and a sensor (not shown), and a light beam from laser n (228) may be tilted further downwards to illuminate an area 238 in the environment.

Even though LIDAR system 200 may provide 3-D environmental coverage, the coverage is rather limited and may require multiple sets of light source and sensor pairs. Furthermore, moving parts, such as the sets of rotating scanning platforms, may wear out over time and cause potential hardware failure.

Figure 3:
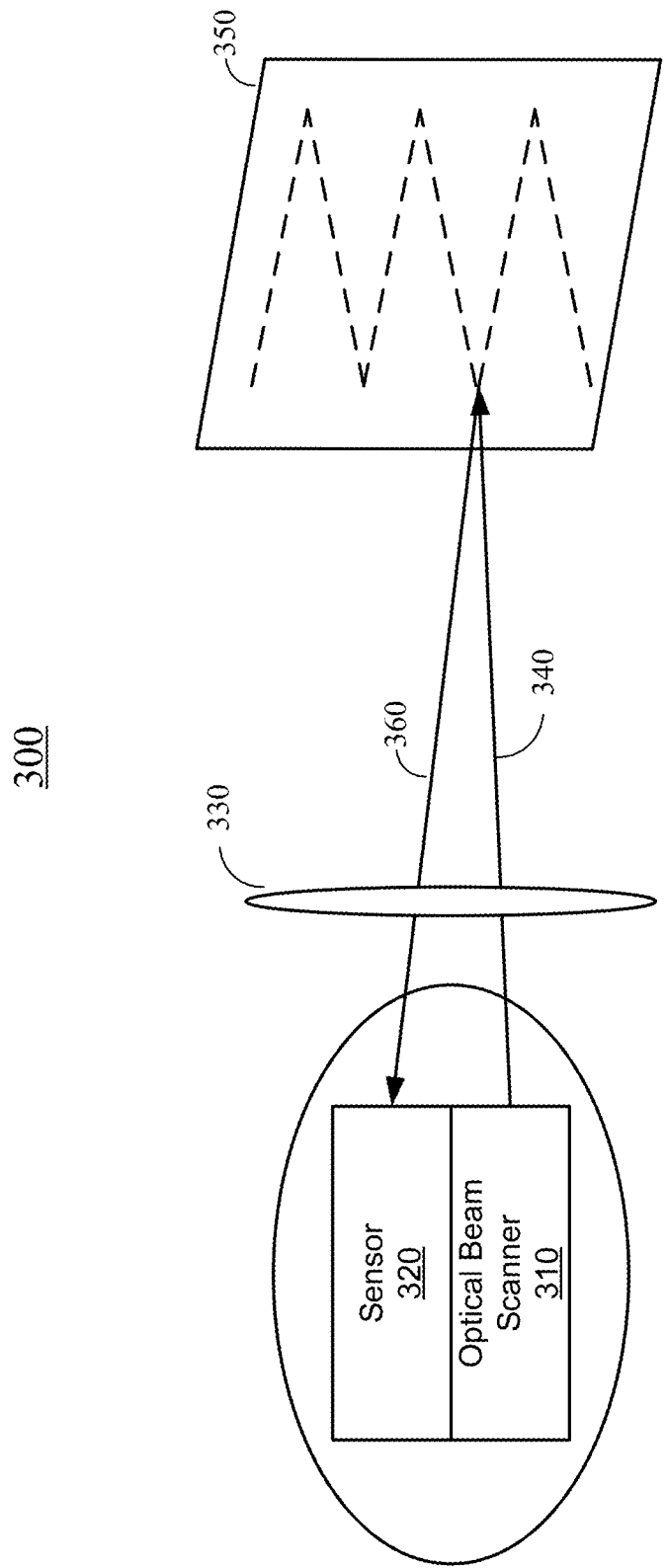
FIG. 3 illustrates an example LIDAR system with a two-dimensional scanning pattern on a flat plane in a field-of-view (FOV) of the LIDAR system.

FIG. 3 illustrates an example LIDAR system 300 with a two-dimensional scanning pattern on a flat plane in a field-of-view (FOV) of the LIDAR system. LIDAR system 300 may include an optical beam scanner 310, a sensor 320, and a lens 330. Optical beam scanner 310 may include an optical source, such as a laser, a laser diode, a VCSEL, a light-emitting diode, or other optical source, as described above with respect to light source 120 of FIG. 1. Optical beam scanner 310 may also include a light directing device, such as a scanning stage, a piezoelectric actuator, a MEMS device, or an optical phased array that can change the direction of the transmitted laser beam from the laser. Lens 330 may be used to collimate the laser beam from optical beam scanner 310 such that collimated laser beam 340 may propagate over a long distance to a target without spreading significantly. Lens 330 may also focus the laser beam from optical beam scanner 310 onto a small spot on the target. As a result of the small beam spot, the resolution of the LIDAR system may be improved. Lens 330 may also be used to expand the laser beam or divert the laser beam from optical beam scanner 310.

Lens 330 may also be used to focus reflected laser beam 360 from a target 350 onto sensor 320. Sensor 320 may be a detector having a working (sensitive) wavelength comparable with the wavelength of the optical source in optical beam scanner 310. The detector may be a high speed photodetector, for example, a PIN photodiode with an intrinsic region between a p-type semiconductor region and an n-type semiconductor region, or an InGaAs APD.

To measure ranges to multiple points on a target or in a field-of-view of the LIDAR system, the laser beam can be scanned in two dimensions as shown in FIG. 3. In order to achieve the 2-D scan pattern on a flat plane in the FOV of a LIDAR system, the LIDAR system may use, for example, a 2-D scanning mechanism, such that the laser beam may be scanned in, for example, a horizontal raster pattern and/or a vertical raster pattern as shown in FIG. 3. As described above, the 2-D scanning mechanism may include, for example, a multi-dimensional mechanical stage, a Galvo-controlled mirror, a microelectromechanical (MEMS) mirror driven by micro-motors, a piezoelectric translator/transducer using piezoelectric material such as a quartz or lead zirconate titanate (PZT) ceramic, an electromagnetic actuator, or an acoustic actuator. Laser beam scanning may also be achieved without mechanical movement of any component, for example, using a phased array technique where phases of laser beams from lasers in a 2-D laser array may be modulated to alter the wave front of the superimposed laser beam. In some embodiments, a resonant fiber scanning technique may be used to scan a laser beam. Due to the flexibility of the optical fiber, a wide field of view and a high resolution may be achieved. In addition, a resonant fiber beam scanner may be small and less expensive.

It is noted that even though FIG. 3 shows a scanning pattern on a flat rectangular area in a field-of-view of the LIDAR system, a LIDAR system may be implemented to covering any range of spherical angle around the LIDAR system.

Because LIDAR system 300 may only use one sensor or a small number of sensors, these sensors may be relatively easy to calibrate. For example, when only one sensor is used, a user may not need to calibrate the relative light sensitivity and timing between sensors. In addition, scanning LIDARs may point a narrow laser beam on the targets, and thus may create high-resolution point clouds. Scanning LIDAR system 300 may also be well-suited for tracking a single object by locking on to the object.

However, 2-D scanning LIDAR systems, such as LIDAR system 300, generally include moving parts that may wear out over time and cause potential hardware failure. Additionally, complex mechanisms may be used to scan in both horizontal and vertical planes, which may be prone to system failure. Further, it may take a scanning LIDAR system a substantial amount of time to scan an entire field-of-view for a full 3-D scanning of an environment. Thus, if the objects within the scene undergo substantial relative motion during the time of a full scanning of the FOV, there may be undesirable artifacts and/or motion blur in the resulting 3-D images. Additionally, to achieve high density point clouds, a laser with high frequency laser pulses may be used, which may be difficult to achieve and may be more expensive.

Figure 4:
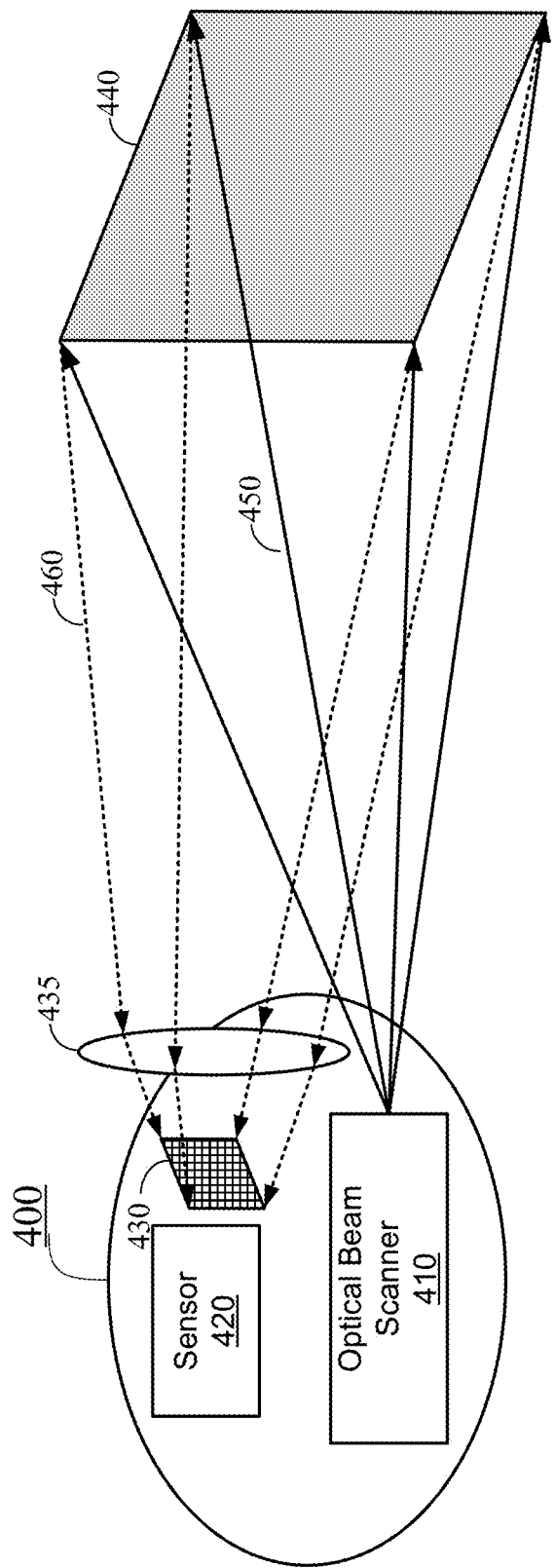
FIG. 4 illustrates an example flash LIDAR system.

FIG. 4 illustrates an example flash LIDAR system 400 that can be used for 3-D environmental scanning. Flash LIDAR system 400 may include an optical beam scanner 410 that can be configured to form a wide laser beam 450 to illuminate an entire FOV 440 in the far field. Flash LIDAR system 400 may also include an optical device 435 that is configured to collect reflected beam 460 from FOV 440 in the far field and focus reflected beam 460 onto a sensor 420 that may include a 2-D sensor array 430. Each pixel of sensor array 430 may measure the time interval between a time-of-departure of a laser pulse from optical beam scanner 410 and a time-of-arrival at sensor 420 of the laser pulse reflected from a particular point in the environment. The pixel in sensor array 430 may also measure the intensity of the laser pulse reflected from a particular point in the environment. In this way, an image of the FOV may be generated.

One advantage of the flash LIDAR systems is that they may have no moving parts. This eliminates one failure-prone component of the scanning LIDAR system. These systems, however, achieve this advantage through the use of a large detector array. Each pixel in the detector array may have its own sensitivity to light and timing offset, and thus each pixel in these LIDAR systems may need to be individually calibrated for both light sensitivity and timing offset. Because the large detector array may have more detectors, they are more difficult and time-consuming to calibrate.

Since the entire scene of a flash LIDAR is illuminated at once with a laser pulse, the 3-D point cloud for the scene can be generated at once. Because all relative motion in the scene is substantially slower than the speed of light, no noticeable motion blur may be observed in individual Flash LIDAR images. However, a high power laser may be needed to illuminate the entire FOV such that the intensity of the light beam on a target in the FOV is strong enough to achieve a sufficient signal-to-noise ratio. Therefore, at shorter ranges where the size of the light beam is relatively small, the power density of the laser beam may exceed a safe limit. For long-range operations, the FOV may be large and thus the output power of the laser may need to be high. Therefore, the range of the flash LIDAR may be limited by the eye safety considerations and/or the available output power of the laser source.

To overcome the limitations of the scanning LIDAR systems as illustrated in FIGS. 2 and 3 and the flash LIDAR systems as illustrated in FIG. 4, a hybrid LIDAR system may be used as described in various embodiments below. The hybrid LIDAR system may include a beam shaping subsystem configured to generate an illumination pattern that is elongated in a first direction and focused in a direction orthogonal to the first direction. The hybrid LIDAR system may further include a scanning subsystem configured to scan the elongated illumination pattern in a second direction. The second direction may be different from the first direction, such as orthogonal to the first direction or at any angle other than 0° and 180° with respect to the first direction. The hybrid LIDAR system may also include an elongated sensor array, such as a one-dimensional or a two-dimensional sensor array with a high aspect ratio, and one or more lenses for imaging reflected beams from targets in the FOV onto the elongated sensor array. The hybrid LIDAR system may also be referred to as a line flash LIDAR system.

The hybrid LIDAR system may overcome the limitations of the 2-D scanning LIDAR systems and the flash LIDAR systems by using a simpler scanning mechanism (e.g., scanning in a single plane or dimension only) and spreading the laser beam across an elongated area smaller than the entire FOV such that a light source with a lower power may be used to provide sufficient light intensity in the far field for long-range operations while keeping the light intensity in short ranges below the eye safety limitation. The hybrid LIDAR system may allow for higher data acquisition rates compared with a scanning LIDAR system that uses single-point scanning. The hybrid LIDAR system may also provide a higher scanning resolution and a higher accuracy.

Figure 5:
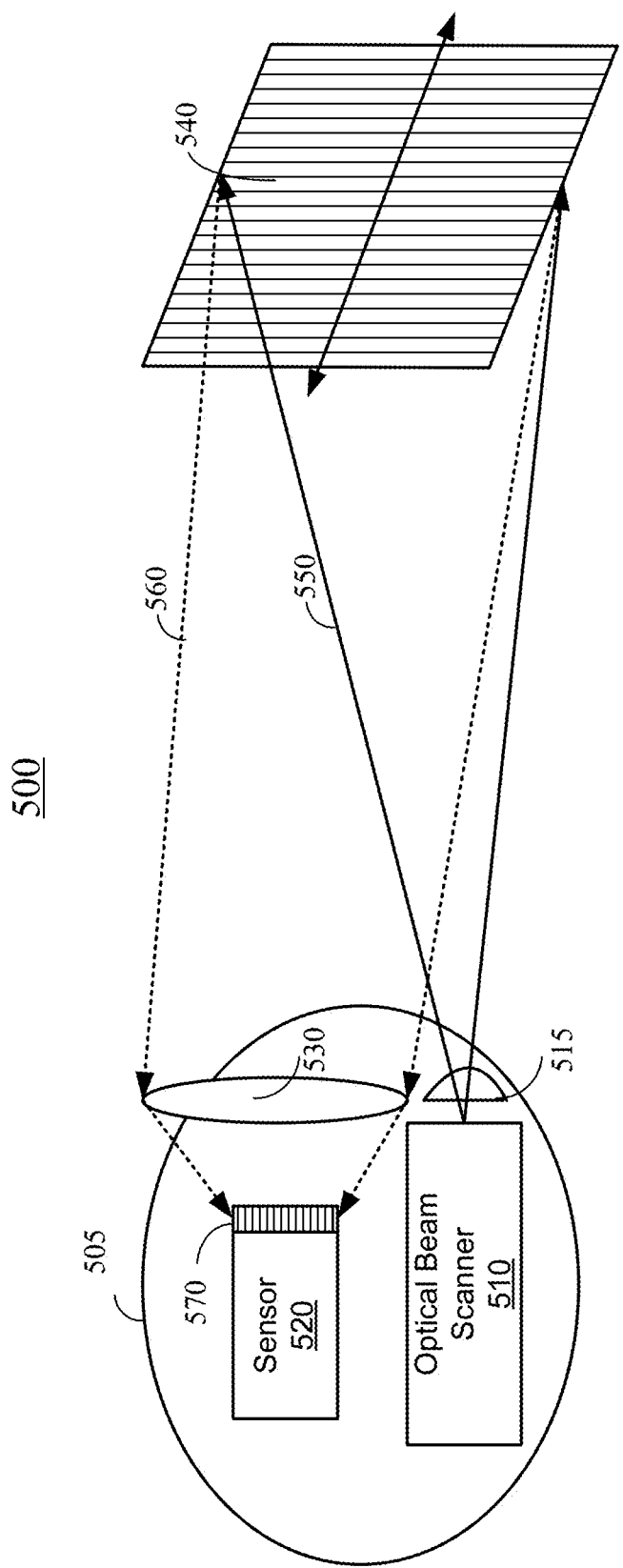
FIG. 5 illustrates an example hybrid LIDAR system, according to one embodiment of this disclosure.

FIG. 5 illustrates an example hybrid LIDAR system 500 that scans over a flat FOV. Hybrid LIDAR system 500 may include a scanning platform 505, an optical beam scanner 510, and a sensor 520. Optical beam scanner 510 may include a light source, such as a laser or a laser array, as described above with respect to FIGS. 1 and 3. Optical beam scanner 510 may also include a beam shaping subsystem 515 that can transform a light beam from the light source into an elongated optical beam in the far field, such as a rectangle, a quadrangle, or an ellipse, with a large aspect ratio of height over width, rather than a single point or spot. For example, the aspect ratio may be greater than, for example, 10, 20, 50, 100, 200, 500, 1000, or higher. Beam shaping subsystem 515 may include, for example, a cylindrical lens, a lens array, or a micro-optical element designed to modify the wavefront of a laser beam and perform agile beam transformation for expanding the light beam in one direction and/or focusing the light beam in another direction. In some embodiments, the light source of optical beam scanner 510 may include a laser array where the light beam from each laser of the laser array may be tilted differently such that the laser beams from the laser of the laser array may generate an elongated illumination pattern.

Light beam 550 from beam shaping subsystem 515 may illuminate an elongated illumination area 540 in the far field. At least a portion of light beam 550 may be reflected by objects in elongated illumination area 540 as a reflected beam 560. At least a portion of reflected beam 560 may be collected by a receiver optical subsystem 530 and projected onto sensor 520 along with background radiations from various sources in the FOV. Receiver optical subsystem 530 may be an imaging system that projects the image of objects in elongated illumination area 540 onto sensor 520, or a non-imaging system that focuses reflected beam 560 onto sensor 520. Receiver optical subsystem 530 may include one or more lenses, such as a cylindrical lens, a lens array, a micro-optical element, or other optical elements.

Sensor 520 may include a detector array 570 having a working (sensitive) wavelength comparable with the wavelength of the light source of optical beam scanner 510 as described above with respect to FIGS. 1-3. Detector array

570 may include a 1-D or 2-D detector array, where each detector in the detector array may be referred to as a pixel of the detector array. Light reflected from different portions of an illuminated area may be detected by different detectors of the detector array. In embodiments where the detector array is a 1-D array, such as a vertical array, receiver optical subsystem 530 of hybrid LIDAR system 500 of FIG. 5 may, for example, image the returning light along a vertical axis, and concentrate light distributed along a horizontal axis, onto the 1-D vertical array, which may provide information regarding the vertical positions and ToFs of the reflected beam from different vertical positions in elongated illumination area 540 in the FOV. Detector array 570 may include a rectangular 2-D detector array with a high aspect ratio. For example, a width of the 2-D detector array may be less than ⅒, ¹⁄₂₀, ¹⁄₅₀, ¹⁄₁₀₀ or less of a length (or height) of the 2-D detector array. The number of detectors in the width direction of the 2-D detector array may be less than, for example, ⅒, ¹⁄₂₀, ¹⁄₅₀, ¹⁄₁₀₀ or less of the number of detectors in the length (or height) direction of the 2-D detector array. A 2-D sensor array may be more complex, but may limit the field of view of each sensor pixel, and thus may reduce the amount of background radiation visible to each detector.

Scanning platform 505 may enable a one-dimensional (1-D) scanning in a single plane, such as a horizontal plane. Scanning platform 505 may include a rotation stage or any other scanning mechanism as described above with respect to FIGS. 1-3. As scanning platform 505 rotates, optical beam scanner 510, sensor 520, beam shaping subsystem 515, and receiver optical subsystem 530 may rotate with scanning platform 505; light beam 550 may illuminate different elongated areas in the far field; and reflected beam 560 from each of the illuminated elongated areas in the far field may be projected onto detector array 570, thus accomplishing a 3-D environmental scan. In some systems, scanning platform 505 may be stationary and the 1-D scanning may be achieved through, for example, phased array techniques as described above.

In this way, the scanning subsystem may provide information of the horizontal position of a target point that reflects light and the detector array may provide information of the vertical position of the target point that reflects light.

Figure 6:
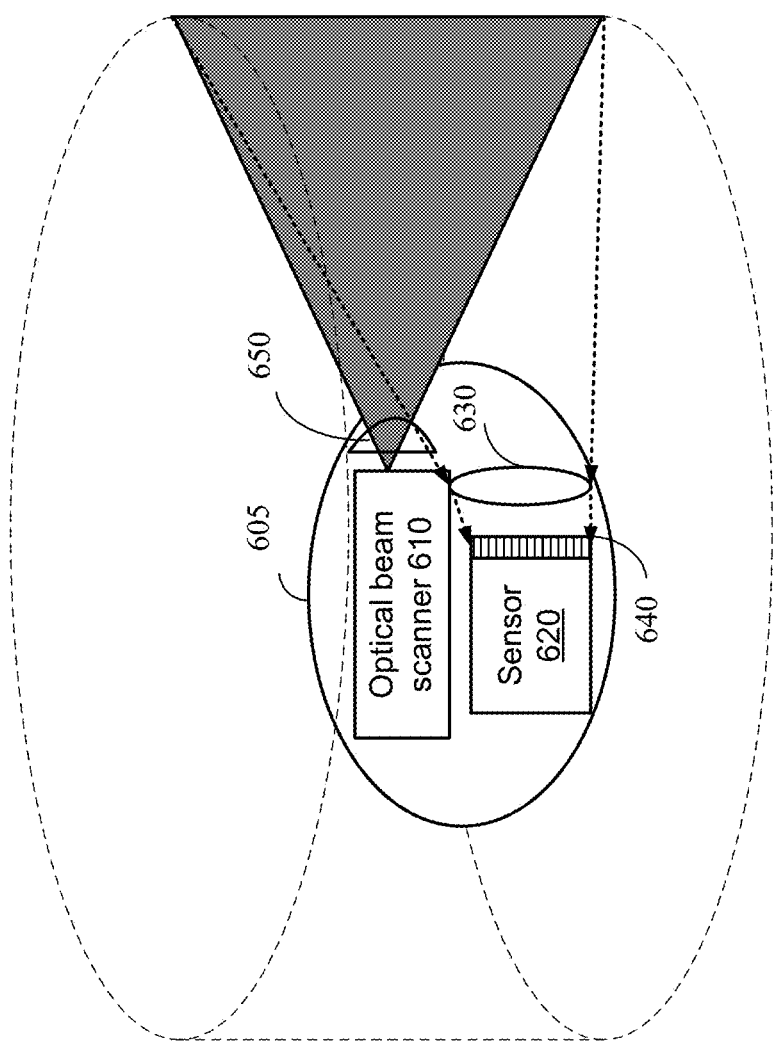
FIG. 6 illustrates another example hybrid LIDAR system, according to one embodiment of this disclosure.

FIG. 6 illustrates another example hybrid LIDAR system 600 that may scan over a 360 degree circular FOV. As hybrid LIDAR system 500 of FIG. 5, hybrid LIDAR system 600 may include a scanning platform 605, an optical beam scanner 610, a sensor 620, a receiver optical subsystem 630, a detector array 640, and a beam shaping subsystem 650. Optical beam scanner 610 may be similar to optical beam scanner 510 of FIG. 5 as described above. Sensor 620 may be similar to sensor 520 of FIG. 5 as described above. Receiver optical subsystem 630, detector array 640, and beam shaping subsystem 650 of FIG. 6 may correspond to receiver optical subsystem 530, detector array 570, and beam shaping subsystem 515 of FIG. 5 as described above. Scanning platform 605 may be capable of scanning over 360 degree in a single plane. As a result, a whole 360 degree circular FOV may be illuminated after one single scan as shown in FIG. 6. As described above, the 1-D scanning may be accomplished in a variety of ways, for example, by using actuators, rotating stages, 1-D phased arrays, single-axis MEMS mirrors, VCSEL arrays, piezoelectric elements, phased array techniques, or any combination thereof.

It is noted that even though FIGS. 5 and 6 illustrate the elongated illumination area, such as elongated illumination area 540, as a vertical stripe and the 1-D scanning in a horizontal plane, the illuminated elongated area may be a rectangle, a quadrangle, an ellipse with any desirable orientation, such as tilted from a vertical direction, and/or any other elongated shape. The 1-D scanning plane may be at any angle other than parallel with the elongated illumination area.

In various embodiments, the orientation of components in the subsystems of the LIDAR system may be arranged differently from the orientation shown in FIGS. 5 and 6, for example, by rotating some or all components by 90 degrees.

The hybrid LIDAR system described above may have several advantages over the scanning LIDAR system or the flash LIDAR system. For example, the resolution of the hybrid LIDAR system can be improved over a 2-D scanning LIDAR or a flash LIDAR through a combination of a fine-step scanning of a thin line illumination pattern in one direction and a detection with a high resolution elongated detector array arranged in, for example, an orthogonal direction.

More specifically, the light beam can be more finely stepped in one direction than the 2-D scanning LIDAR systems because more steps along the 1-D scanning direction are possible per frame (i.e., timing requirements would not constrain the step size) compared with a 2-D scanning LIDAR system as shown in FIG. 3, thus improving the resolution along the scanning direction. Furthermore, a one-directional scanner may be implemented with higher mechanical precision and less complexity than multi-directional scanning.

The light beam can be more finely focused into a thin line illumination pattern in the far field. For example, for most edge-emitting lasers, the laser beam generally diverges more in one direction than in the other direction. Thus, the less diverging direction can be aligned with the width direction of the light beam such that the width of the light beam can be minimized to form a thin line for high resolution scanning. In some embodiments using pixelated scanning approaches such as optical phased arrays or VCSEL arrays, a large number of pixels in two orthogonal dimension may be needed to produce a small light spot in the far field. Due to constrains such as the number of fan-out limitations, packing density, control complexity, scanning rate, etc., the minimum size of the light spot may not be able to meet the resolution requirement in some applications. On the other hand, to generate a thin line illumination pattern, more pixels of the light source can be arranged in the direction of the narrow width of the thin line illumination pattern than the pixels arranged in the length or height direction of the illumination pattern. Therefore, less total number of pixels may be used to generate a more finely focused line pattern than the number of pixels used to generate a light spot with similar dimensions in both directions.

Furthermore, a sensor including a 1-D detector array or a 2-D detector array with a high aspect ratio can have a better resolution in one direction than a 2-D detector array having similar or a larger number of total pixels but having a length close to a width, because of, for example, fan-out limitations, packing density, or read-out rate. For example, a 2-D detector array with 100×100 (10 K) pixels may have 100 pixels in a horizontal or vertical direction, but a 1-D detector array with 500×10 (5 K) pixels may have 500 pixels and thus better resolution in the horizontal or vertical direction. In some embodiments, a 1-D detector array may be implemented using a 2-D detector array by combining pixels in each row or column.

As described above, each pixel in a detector array may have its own sensitivity to light and timing offset, and thus each pixel in a LIDAR system may need to be individually calibrated for both the light sensitivity and the timing offset. The amount of calibration in a system with a less number of detector pixels may be reduced and the errors caused by the non-uniformity of the light sensitivity and/or the timing offset among the detector pixels may be reduced for improved accuracy.

In this way, the overall resolution and accuracy of the hybrid LIDAR system can be improved over the 2-D scanning LIDAR systems or the flash LIDAR systems using a sensor having a smaller or same number of total pixels and a less complex scanning mechanism.

Furthermore, the hybrid LIDAR system disclosed herein may have a longer operation range and may generate light beams with a lower intensity in short ranges compared with a flash LIDAR system. Because the light beam is spread over an elongated area smaller than the entire FOV, a light source with a lower output power may be used to provide sufficient light intensity in the far field for long-range operations. As a result, in short ranges, the intensity of the light beam may be reduced to a value below the eye safety limitation.

In addition, as described above, the hybrid LIDAR system may allow for higher data acquisition rates compared with a scanning LIDAR system that uses a single-point scanning.

Figure 7:
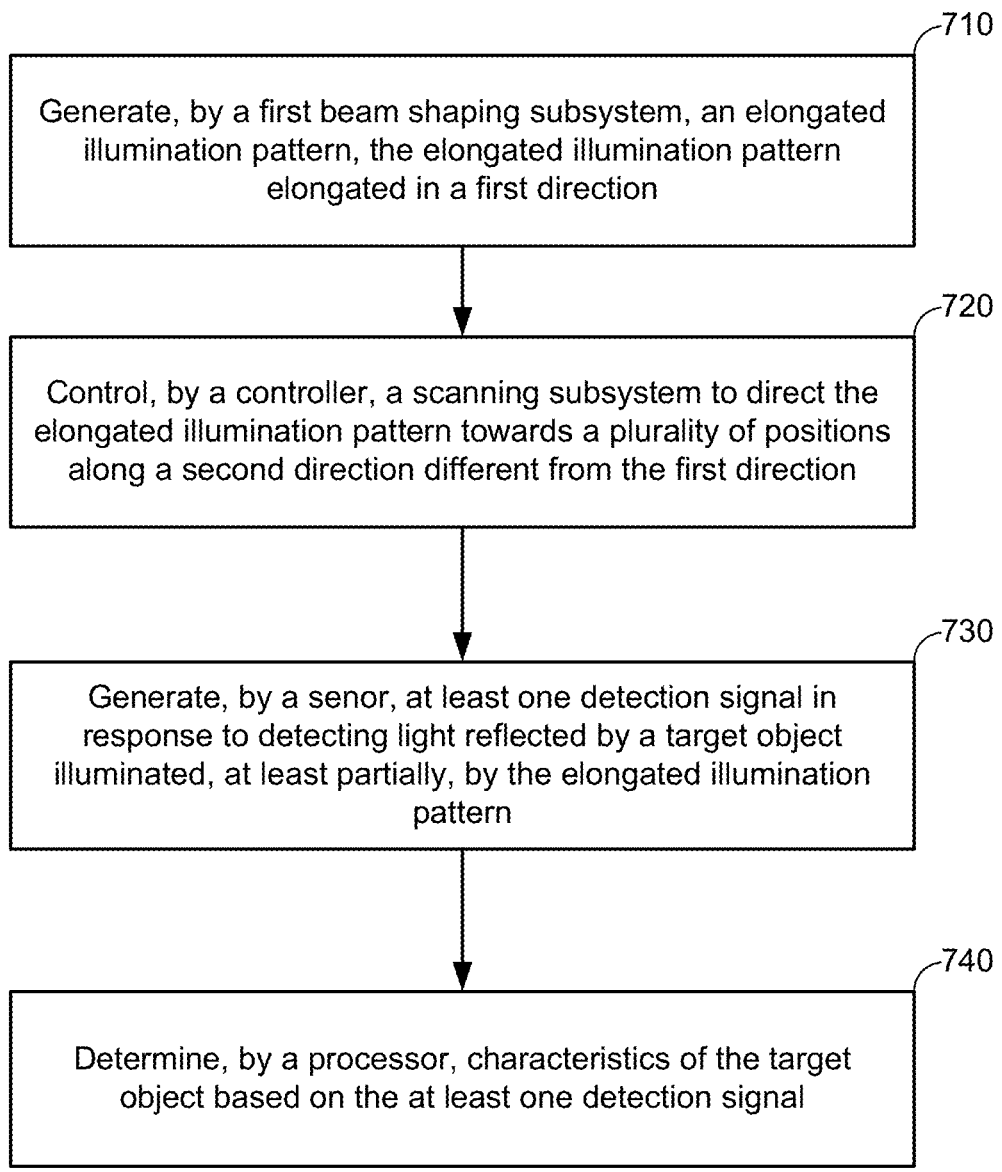
FIG. 7 is a flow chart illustrating an embodiment of a method for remote sensing.

FIG. 7 is a flow chart 700 illustrating an embodiment of a method for remote sensing using, for example, a LIDAR system. At block 710, a first beam shaping subsystem, such as beam shaping subsystem 515 of FIG. 5 or beam shaping subsystem 650 of FIG. 6, may generate an elongated illumination pattern, the elongated illumination pattern elongated in a first direction. In some embodiments, the light source of a LIDAR system may include a laser array where the light beam from each laser of the laser array may be tilted differently as described above such that the laser beams from the laser of the laser array may generate an elongated illumination pattern. The elongated illumination pattern may have a high aspect ratio, such as greater than 10, 20, 50, 100, 1000, or more, between a size in the first direction and a size in a second direction different from the first direction, such as a direction orthogonal to the first direction. The elongated illumination pattern may include a thin line, a quadrangle, such as a rectangle, or an ellipse. The first beam shaping subsystem may include at least one of a cylindrical lens, a micro-optical element, or a lens array. The first beam shaping subsystem may generate the elongated illumination pattern by transforming a laser beam emitted from a pulsed laser. In various embodiments, means for performing the function at block 710 may include, but are not limited to, for example, beam shaping subsystem 515 of FIG. 5 or beam shaping subsystem 650 of FIG. 6.

Figure 8:
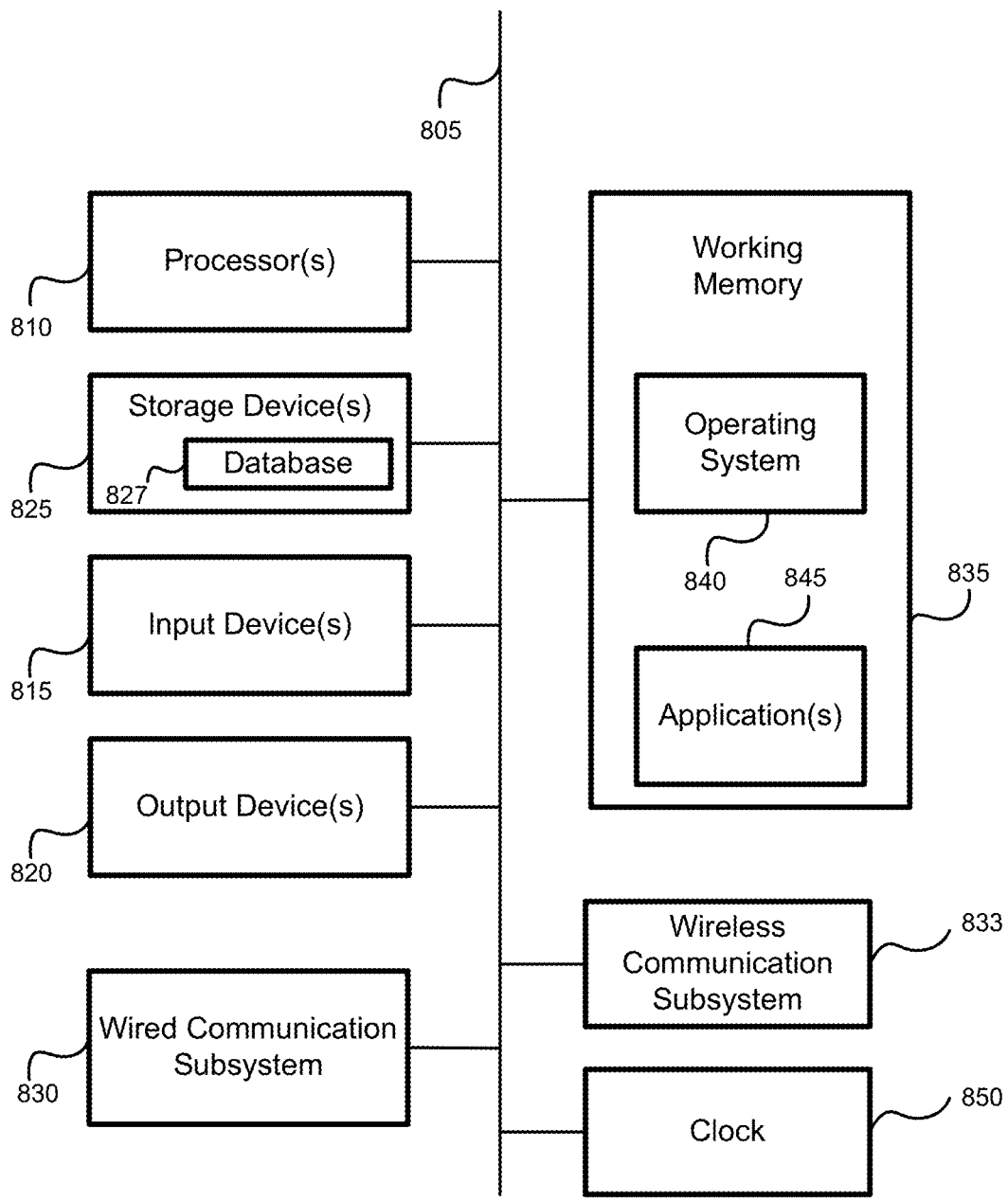
FIG. 8 is a block diagram of an example computing system for implementing some of the examples described herein.

At block 720, a controller may control a scanning subsystem, such as scanning platform 505 and optical beam scanner 510 of FIG. 5 or scanning platform 605 and an optical beam scanner 610 of FIG. 6, to direct the elongated illumination pattern towards a plurality of positions along the second direction, such as a direction orthogonal to the first direction. As described above, the scanning subsystem may use many different types of beam scanning mechanisms, for example, a rotating platform driven by a motor, a multi-dimensional mechanical stage, a Galvo-controlled mirror, a MEMS reflector driven by micro-motors, a piezoelectric translator/transducer using piezoelectric material such as a quartz or PZT ceramic, an electromagnetic actuator, or an acoustic actuator. The scanning subsystem may be a platform without mechanical movement of any component, for example, using a phased array technique where phases of lasers or light emitting elements in a 1-D or 2-D array may be changed to alter the wavefront of the superimposed laser beam. The scanning subsystem may be configured to scan the elongated illumination pattern linearly or circularly. In some embodiments, means for performing the function at block 720 may include, but are not limited to, for example, scanning platform 505 and optical beam scanner 510 of FIG. 5 or scanning platform 605 and an optical beam scanner 610 of FIG. 6, and computing system 800 as illustrated in FIG. 8 and described in detail below.

Optionally, a second beam shaping subsystem, such as receiver optical subsystem 530 of FIG. 5 or receiver optical subsystem 630 of FIG. 6, may project light reflected from an area illuminated by the elongated illumination pattern onto the sensor. The second beam shaping subsystem may be configured to image the area illuminated by the elongated illumination pattern onto the sensor. The second beam shaping subsystem may be configured to focus the light reflected from the illuminated area at least in the second direction. The second beam shaping subsystem may include at least one of a cylindrical lens, a micro-optical element, or a lens array.

At block 730, a sensor, such as sensor 520 of FIG. 5 including detector array 570 or sensor 620 of FIG. 6 including detector array 640, may generate at least one detection signal in response to detecting light reflected by a target object illuminated, at least partially, by the elongated illumination pattern. As described above, the sensor may include a 1-D or 2-D detector array. Light reflected from different portions of an illuminated elongated area may be detected by different detectors of the detector array, which may provide information regarding the positions and TOFs of the reflected beams from different portions in the illuminated elongated area. The sensor may include a rectangular 2-D detector array with a high aspect ratio. For example, a width of the 2-D detector array may be less than $\frac{1}{10}$, $\frac{1}{20}$, $\frac{1}{50}$, $\frac{1}{100}$ or less of a length (or height) of the 2-D detector array. The number of detectors in the width direction of the 2-D detector array may be less than, for example, $\frac{1}{10}$, $\frac{1}{20}$, $\frac{1}{50}$, $\frac{1}{100}$ or less of the number of detectors in the length (or height) direction of the 2-D detector array. In some embodiments, means for performing the function at block 730 may include, but are not limited to, for example, sensor 520 of FIG. 5 including detector array 570 or sensor 620 of FIG. 6 including detector array 640.

At block 740, based at least partially on the at least one detection signal, one or more processors, such as processor(s) 810 illustrated in FIG. 8 and described in detail below, may determine a characteristic of the target object, such as a distance of the object from the LIDAR system, the profile of the target object, or the reflective properties of the target object. The at least one detection signal may also be used to generate a 3-D image of the target object. In some embodiments, means for performing the function at block 740 may include, but are not limited to, for example, processor(s) 810 as illustrated in FIG. 8 and described in detail below.

It is noted that even though FIG. 7 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

FIG. 8 illustrates components of an example computing system 800 for implementing some of the examples described herein. For example, computing system 800 can be used to control scanning platform 505, optical beam scanner 510, and sensor 520 of FIG. 5, or scanning platform 605, optical beam scanner 610, and sensor 620 of FIG. 6, or to perform some functions described above with respect to FIG. 7. It should be noted that FIG. 8 is meant only to provide a generalized illustration of various components, any or all of which may be utilized as appropriate. Moreover, system elements may be implemented in a relatively separated or relatively more integrated manner.

Computing system 800 is shown comprising hardware elements that can be electrically coupled via a bus 805 (or may otherwise be in communication, as appropriate). The hardware elements may include a processing unit 810, one or more input devices 815, and one or more output devices 820. Input device(s) 815 can include without limitation camera(s), a touchscreen, a touch pad, microphone(s), a keyboard, a mouse, button(s), dial(s), switch(es), and/or the like. Output devices 820 may include without limitation a display device, a printer, LEDs, speakers, and/or the like.

Processing unit 810 may include without limitation one or more general-purpose processors, one or more special-purpose processors (such as digital signal processing (DSP) chips, graphics acceleration processors, application specific integrated circuits (ASICs), and/or the like), and/or other processing structures or means, which can be configured to perform one or more of the methods described herein.

Computing system 800 can also include a wired communication subsystem 830 and a wireless communication subsystem 833. Wired communication subsystem 830 and wireless communication subsystem 833 can include, without limitation, a modem, a network interface (wireless, wired, both, or other combination thereof), an infrared communication device, a wireless communication device, and/or a chipset (such as a Bluetooth™ device, an International Electrical and Electronics Engineers (IEEE) 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 800. Wired communication subsystem 830 and wireless communication subsystem 833 may include one or more input and/or output communication interfaces to permit data to be exchanged with a data network, wireless access points, other computer systems, and/or any other devices described herein.

Depending on desired functionality, wireless communication subsystem 833 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN and/or WPAN.

Computing system 800 of FIG. 8 may include a clock 850 on bus 805, which can generate a signal to synchronize the various components on bus 805. Clock 850 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other devices while performing the techniques described herein.

Computing system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable and/or the like. Such storage devices may be configured to implement any appropriate data stores, including without limitation, various file systems, database structures, and/or the like. For instance, storage device(s) 825 may include a database 827 (or other data structure) configured to store detected signals as described in embodiments herein.

In many embodiments, computing system 800 may further comprise a working memory 835, which can include a RAM or ROM device, as described above. Software elements, shown as being currently located within working memory 835, can include an operating system 840, device drivers, executable libraries, and/or other code, such as one or more application programs 845, which may comprise software programs provided by various embodiments, and/or may be designed to implement methods, and/or configure systems, provided by other embodiments, as described herein, such as some or all of the methods described in relation to FIG. 7. Merely by way of example, one or more procedures described with respect to the method discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 825 described above. In some cases, the storage medium might be incorporated within a computer system, such as computing system 800. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 800 and/or might take the form of source and/or installable code, which, upon compilation and/or installation on computing system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, electrically erasable programmable read-only memory (EEPROM), compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A light detection and ranging (LIDAR) system comprising:
    a resonant fiber scanning system comprising:
        a first beam shaping subsystem comprising a flexible fiber configured to generate an elongated illumination pattern in a resonant manner, the elongated illumination pattern elongated in a first direction,
        a scanning subsystem configured to direct the elongated illumination pattern towards a plurality of positions along a second direction different from the first direction, and
        a sensor configured to generate at least one detection signal in response to detecting light reflected by a target object illuminated, at least partially, by the elongated illumination pattern, wherein the sensor comprises a one-dimensional array of detectors arranged along the first direction; and
    a processor configured to determine a characteristic of the target object based on the at least one detection signal.

2. The LIDAR system of claim 1, wherein an aspect ratio between a size in the first direction and a size in the second direction of the elongated illumination pattern is greater than 10.

3. The LIDAR system of claim 1, wherein the second direction is orthogonal to the first direction.

4. The LIDAR system of claim 1, further comprising:
    a second beam shaping subsystem configured to project the light reflected by the target object illuminated by the elongated illumination pattern onto the sensor.

5. The LIDAR system of claim 4, wherein the second beam shaping subsystem is configured to focus the light reflected by the target object at least in the second direction.

6. The LIDAR system of claim 4, wherein the second beam shaping subsystem comprises a cylindrical lens configured to focus the light reflected by the target object only in the second direction onto the one-dimensional array of detectors.

7. The LIDAR system of claim 1, further comprising:
    a pulsed laser configured to emit a light beam, wherein the first beam shaping subsystem is configured to transform the light beam into at least a part of the elongated illumination pattern.

8. A method for remote sensing, comprising:
    generating, by a first beam shaping subsystem comprising a flexible fiber operating in a resonant manner, an elongated illumination pattern, the elongated illumination pattern elongated in a first direction;
    controlling, by a controller, a scanning subsystem to direct the elongated illumination pattern towards a plurality of positions along a second direction different from the first direction;
    generating, by a sensor, at least one detection signal in response to detecting light reflected by a target object illuminated, at least partially, by the elongated illumination pattern, wherein the sensor comprises a one-dimensional array of detectors arranged along the first direction; and
    determining, by a processor, a characteristic of the target object based on the at least one detection signal.

9. The method of claim 8, wherein an aspect ratio between a size in the first direction and a size in the second direction of the elongated illumination pattern is greater than 10.

10. The method of claim 8, wherein the second direction is orthogonal to the first direction.

11. The method of claim 8, further comprising:
projecting, by a second beam shaping subsystem, the light reflected by the target object illuminated by the elongated illumination pattern onto the sensor.

12. The method of claim 11, wherein the second beam shaping subsystem is configured to focus the light reflected by the target object at least in the second direction.

13. An apparatus comprising:
means for generating an elongated illumination pattern comprising means for operating a flexible fiber in a resonant manner, the elongated illumination pattern elongated in a first direction;
means for directing the elongated illumination pattern towards a plurality of positions along a second direction different from the first direction;
means for generating at least one detection signal in response to detecting light reflected by a target object illuminated, at least partially, by the elongated illumination pattern, wherein the means for generating the at least one detection signal comprise a one-dimensional array of detectors arranged along the first direction; and
means for determining a characteristic of the target object based on the at least one detection signal.

14. The apparatus of claim 13, wherein an aspect ratio between a size in the first direction and a size in the second direction of the elongated illumination pattern is greater than 10.

15. The apparatus of claim 13, further comprising:
means for projecting the light reflected by the target object illuminated by the elongated illumination pattern onto the means for generating the at least one detection signal.

16. A non-transitory computer-readable storage medium comprising machine-readable instructions stored thereon, the instructions, when executed by one or more processors, causing the one or more processors to:
control, through a controller, a scanning subsystem comprising a flexible fiber operating in a resonant manner to direct an illumination pattern elongated in a first direction towards a plurality of positions along a second direction different from the first direction, wherein the elongated illumination pattern is generated by a beam shaping subsystem;
receive at least one detection signal generated by a sensor in response to detecting light reflected by a target object illuminated, at least partially, by the elongated illumination pattern, wherein the sensor comprises a one-dimensional array of detectors arranged along the first direction; and
determine a characteristic of the target object based on the at least one detection signal.

17. The non-transitory computer-readable storage medium of claim 16, wherein an aspect ratio between a size in the first direction and a size in the second direction of the elongated illumination pattern is greater than 10.

* * * * *